US011239769B2

(12) United States Patent
Matsumoto et al.

(10) Patent No.: US 11,239,769 B2
(45) Date of Patent: Feb. 1, 2022

(54) THYRISTOR STARTER

(71) Applicant: TOSHIBA MITSUBISHI-ELECTRIC INDUSTRIAL SYSTEMS CORPORATION, Tokyo (JP)

(72) Inventors: Yasuaki Matsumoto, Chuo-ku (JP); Hiroshi Ogino, Chuo-ku (JP); Hironori Kawaguchi, Chuo-ku (JP); Akinobu Ando, Chuo-ku (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 0 days.

(21) Appl. No.: 16/611,012

(22) PCT Filed: Jun. 21, 2017

(86) PCT No.: PCT/JP2017/022842
§ 371 (c)(1),
(2) Date: Nov. 5, 2019

(87) PCT Pub. No.: WO2018/235187
PCT Pub. Date: Dec. 27, 2018

(65) Prior Publication Data
US 2020/0177111 A1    Jun. 4, 2020

(51) Int. Cl.
H02P 1/46       (2006.01)
H02K 9/06      (2006.01)
H02P 6/20      (2016.01)
H02P 9/08      (2006.01)
H02P 21/06     (2016.01)
H02P 27/06     (2006.01)

(52) U.S. Cl.
CPC ............... *H02P 1/46* (2013.01); *H02K 9/06* (2013.01); *H02P 6/20* (2013.01); *H02P 9/08* (2013.01);
(Continued)

(58) Field of Classification Search
CPC ..... H02P 1/46; H02P 6/20; H02P 1/52; H02K 9/06; H02M 5/452
See application file for complete search history.

(56) References Cited

U.S. PATENT DOCUMENTS 4,443,747 A * 4/1984 Chausse .................... H02P 1/52
                                                                318/723
4,682,094 A   7/1987 Kuroiwa
(Continued)

FOREIGN PATENT DOCUMENTS

DE   10 2007 021 723 A1    11/2008
EP        2 031 733 A2      3/2009
(Continued)

OTHER PUBLICATIONS

International Search Report dated Sep. 19, 2017 in PCT/JP2017/022842 filed Jun. 21, 2017.
(Continued)

Primary Examiner — Cortez M Cook
(74) Attorney, Agent, or Firm — Oblon, McClelland, Maier & Neustadt, L.L.P.

(57) ABSTRACT

A thyristor starter accelerates a synchronous machine from a stop state to a predetermined rotation speed by sequentially performing a first mode of performing commutation of an inverter by intermittently setting DC output current to zero and a second mode of performing commutation of the inverter by induced voltage of the synchronous machine. A second controller controls the firing phase of a thyristor in a converter such that DC output current of the converter matches a current command value, based on a detection signal of a position detector. In the first mode, the current command value is set such that the current value is higher as the rotation speed of the synchronous machine is higher.

4 Claims, 5 Drawing Sheets

(52) U.S. Cl.
CPC .............. *H02P 21/06* (2013.01); *H02P 27/06* (2013.01); *H02P 2207/05* (2013.01)

(56) References Cited

U.S. PATENT DOCUMENTS

| | | | | |
|---|---|---|---|---|
| 2007/0273220 | A1* | 11/2007 | Koyama | H02K 9/06 310/58 |
| 2011/0247900 | A1* | 10/2011 | Blasko | B66B 1/302 187/247 |
| 2015/0236622 | A1 | 8/2015 | Ogino et al. | |
| 2015/0365020 | A1* | 12/2015 | Ogino | H02M 1/36 318/400.21 |

FOREIGN PATENT DOCUMENTS

| | | |
|---|---|---|
| JP | S61-062388 A | 3/1986 |
| JP | 2007-215261 A | 8/2007 |
| WO | WO 2014/033849 A1 | 3/2014 |

OTHER PUBLICATIONS

Supplementary European Search Report dated Dec. 7, 2020, in Application No. EP 17 91 4125.

Denesdi L., "Static Starting of Gas Turbines" ABB Review, ABB ASEA Brown Boveri, Zurich, CH, No. 3, Jan. 1, 1992, pp. 33-38.

Kato Y. et al., "Studies on a Sensorless Starting Method for Self-Controlled Synchronous Motors without Damper Windings", Electrical Machines and Systems, 2009, ICEMS 2009, International Conference on IEEE, Nov. 15, 2009, pp. 1-5.

Office Action dated Aug. 24, 2021, in Korean Patent Application No. 10-2020-7001320, w/English-language Translation.

Ho-Seon Ryu, et al., "A Study on Starting Algorithm of Large Synchronous Motor for Gas Turbine in Field-Weakening Region using SFC", Transactions of Korean Institute of Power Electronics, 2008, vol. 13, No. 6, pp. 411-419.

* cited by examiner

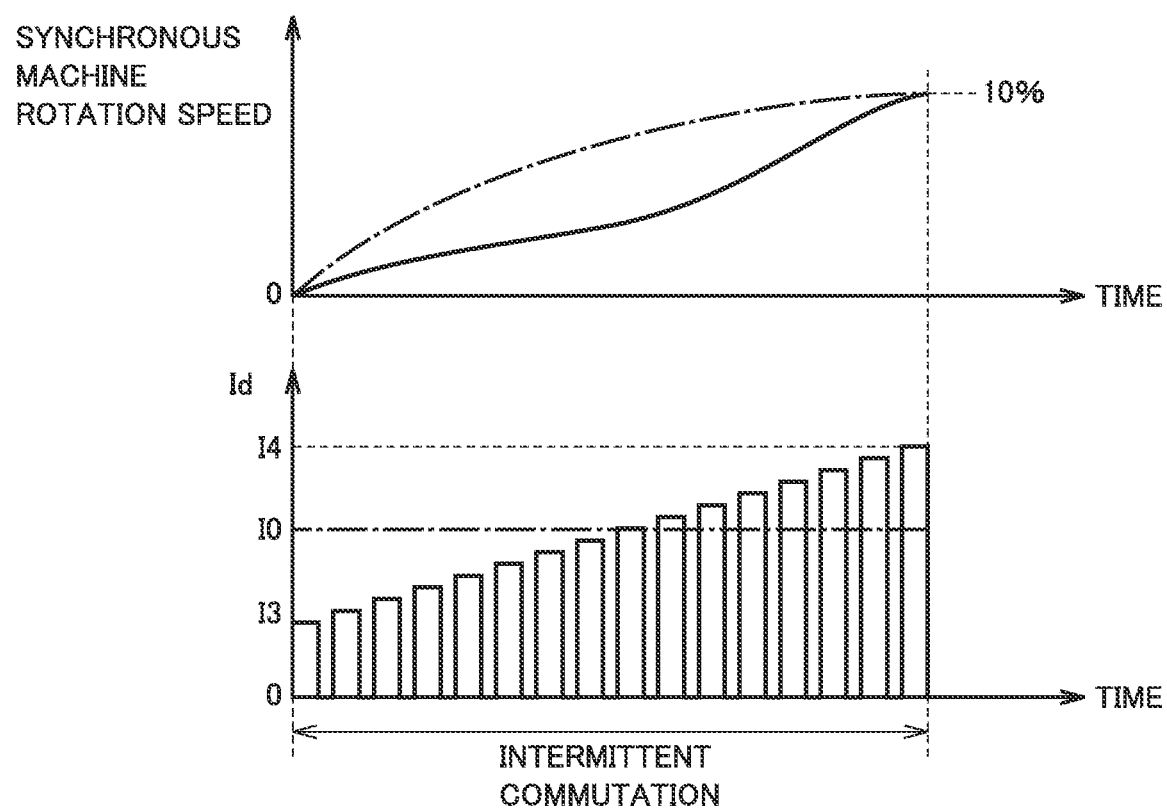

THYRISTOR STARTER

TECHNICAL FIELD

The present invention relates to a thyristor starter.

BACKGROUND ART

Thyristor starters have been developed for staring synchronous machines such as generators and motors (for example, see WO2014/033849 (PTL 1)). A thyristor starter includes a converter for converting AC power into DC power, a DC reactor for smoothing DC power, and an inverter for converting DC power applied from the converter through the DC reactor into AC power with a variable frequency to supply the AC power to a synchronous machine. The AC power supplied to the synchronous machine is controlled whereby the synchronous machine in a stop state can be started and driven at a predetermined rotation speed.

CITATION LIST

Patent Literature

PTL 1: WO2014/033849

SUMMARY OF INVENTION

Technical Problem

Some of cooling structures for cooling the synchronous machine described above are configured to use air or hydrogen gas as a cooling medium and circulate the cooling medium through a passage formed in the rotor and the stator in the synchronous machine. In such a cooling device, the cooling medium is typically circulated using a fan attached to the rotation shaft of the rotor of the synchronous machine.

However, in the above-noted cooling device, when the rotation speed of the synchronous machine is low, that is, at startup or at a low speed of the synchronous machine, the rotation speed of the fan is also low, and the cooling capacity is reduced accordingly. Consequently, the synchronous machine may overheat.

In order to suppress overheating of the synchronous machine, it is effective to reduce current applied to the synchronous machine when the rotation speed of the synchronous machine is low. However, if current applied to the synchronous machine is reduced, the speed-up rate (the rate by which the rotation speed increases) of the synchronous machine decreases, so that it takes time to start the synchronous machine.

Suppressing overheating of the synchronous machine by increasing the cooling capacity of the cooling structure inevitably requires a larger capacity of the cooler for cooling the cooling medium and may lead to increase in device size.

The present invention has been made in order to solve the problem above, and an object of the present invention is to provide a thyristor starter capable of starting a synchronous machine in a short time while suppressing overheating of the synchronous machine.

Solution to Problem

According to an aspect of the present invention, a thyristor starter for starting a synchronous machine includes a converter, a DC reactor, an inverter, a position detector, a first controller, and a second controller. The converter is configured to convert AC power into DC power. The DC reactor smoothes the DC power. The inverter is configured to convert the DC power applied from the converter through the DC reactor into AC power with a variable frequency and supply the AC power to the synchronous machine. The position detector is configured to detect a rotor position of the synchronous machine. The first controller is configured to control a firing phase of a thyristor in the inverter, based on a detection signal of the position detector. The second controller is configured to control a firing phase of a thyristor in a converter such that DC output current of the converter matches a current command value, based on a detection signal of the position detector. The thyristor starter is configured to accelerate the synchronous machine from a stop state to a predetermined rotation speed by sequentially performing a first mode of performing commutation of the inverter by intermittently setting the DC output current to zero and a second mode of performing commutation of the inverter by induced voltage of the synchronous machine. In the first mode, the current command value is set such that a current value is higher as the rotation speed of the synchronous machine is higher.

Advantageous Effects of Invention

The present invention can provide a thyristor starter capable of starting a synchronous machine in a short time while suppressing overheating of the synchronous machine.

BRIEF DESCRIPTION OF DRAWINGS

FIG. 8 is a time chart schematically showing the relation between the rotation speed of the synchronous machine and DC output current of the converter in the intermittent commutation mode.

DESCRIPTION OF EMBODIMENTS

Embodiments of the present invention will be described in detail below with reference to the drawings. The same or corresponding parts are denoted by the same reference signs and a description thereof will not be repeated.

Figure 1:
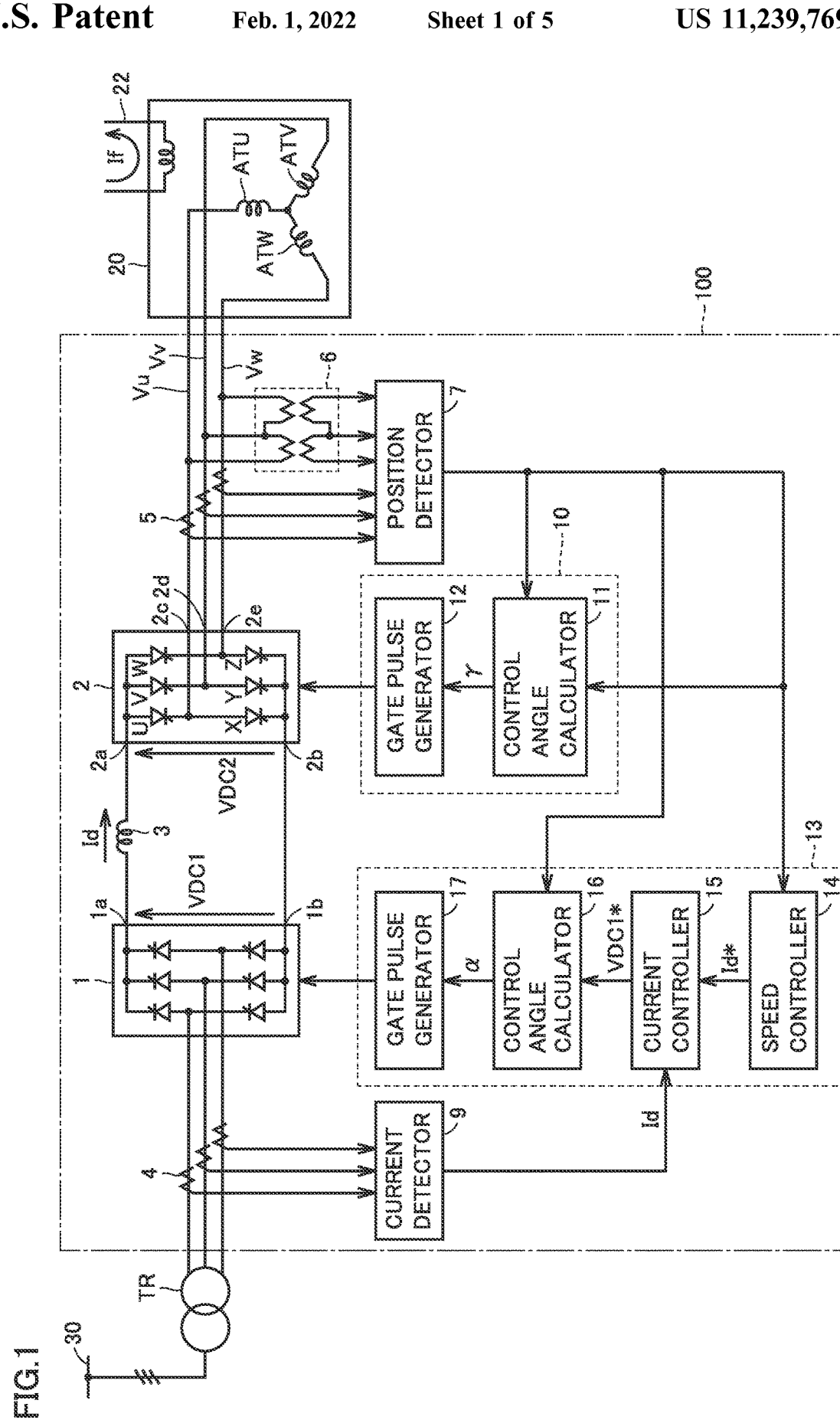
FIG. 1 is a circuit block diagram showing a configuration of a thyristor starter according to an embodiment of the present invention.

FIG. 1 is a circuit block diagram showing a configuration of a thyristor starter according to an embodiment of the present invention. Referring to FIG. 1, a thyristor starter 100 according to an embodiment of the present invention starts a synchronous machine 20 by accelerating the stopped synchronous machine 20 to a predetermined rotation speed.

Synchronous machine 20 includes a stator having armature windings ATU, ATV, and ATW and a rotor having a field winding 22. Synchronous machine 20 is coupled to, for example, a gas turbine of a thermal power plant and is rotatably driven by the gas turbine. In the following description, a predetermined rotation speed may be referred to as "rated rotation speed". For example, when the frequency of an AC power supply 30 is 60 Hz, the rated rotation speed is set to 3600 rpm.

Thyristor starter 100 is connected to the secondary side of a transformer TR. The primary side of transformer TR is connected to AC power supply 30. Transformer TR converts three-phase AC voltage supplied from AC power supply 30 into three-phase AC voltage having a predetermined voltage value and applies the three-phase AC voltage to thyristor starter 100.

Thyristor starter 100 includes a converter 1, a DC reactor 3, and an inverter 2. Converter 1 is a three-phase full-wave rectifier including at least six thyristors and converts three-phase AC power from transformer TR into DC power with a variable voltage.

DC reactor 3 is connected between positive-side output terminal 1a of converter 1 and positive-side input terminal 2a of inverter 2. DC reactor 3 smooths DC output current Id from converter 1. Negative-side output terminal 1b of converter 1 and negative-side input terminal 2b of inverter 2 are connected to each other. Another DC reactor 3 may be connected between negative-side output terminal 1b of converter 1 and negative-side input terminal 2b of inverter 2.

Three output terminals 2c, 2d, and 2e of inverter 2 are connected to three armature windings ATU, ATV, and ATW, respectively, of synchronous machine 20. Inverter 2 is a three-phase external-commutated inverter including at least six thyristors U, V, W, X, Y, and Z.

Thyristors U, V, and W have anodes connected together to positive-side input terminal 2a and cathodes connected to output terminals 2c, 2d, and 2e, respectively. Thyristors X, Y, and Z have anodes connected to output terminals 2c, 2d, and 2e, respectively, and cathodes connected together to negative-side input terminal 2b.

One of thyristors U, V, and W and one of thyristors X, Y, and Z are conducting in synchronization with three-phase AC voltages Vu, Vv, and Vw, whereby inverter 2 converts DC power supplied from converter 1 through DC reactor 3 into three-phase AC power with a variable frequency and a variable voltage and applies the AC power to the stator (armature windings ATU, ATV, and ATW) of synchronous machine 20. This can increase the rotation speed of synchronous machine 20.

Thyristor starter 100 further includes current transformers 4 and 5, a voltage detector 6, a position detector 7, a current detector 9, an inverter controller 10, and a converter controller 13.

Current transformer 4 detects three-phase AC current flowing from transformer TR to converter 1 and applies a signal indicating the detected value to current detector 9. Current detector 9 calculates DC current Id output from converter 1, based on the signal from current transformer 4, and applies a signal indicating the calculated value to converter controller 13. Specifically, current detector 9 has a full-wave rectifying diode rectifier and converts the detected three-phase AC current into DC current Id.

Current transformer 5 detects current flowing from inverter 2 to armature windings ATU, ATV, and ATW of synchronous machine 20 and applies a signal indicating the detected value to position detector 7.

Voltage detector 6 detects instantaneous values of three-phase AC voltages Vu, Vv, and Vw supplied to synchronous machine 20 from inverter 2 and applies a signal indicating the detected values to position detector 7. Specifically, voltage detector 6 detects two line voltages of line voltages of three-phase AC voltages in armature windings ATU, ATV, and ATW of synchronous machine 20 (in FIG. 1, AC voltage Vu-v between the U-phase and the V-phase and AC voltage Vv-w between the V-phase and the W-phase). In this way, AC voltages of the U phase, the V phase, and the W phase can be obtained through calculation by detecting at least two line voltages of AC voltage Vu-v between the U phase and the V phase, AC voltage Vv-w between the V phase and the W phase, and AC voltage Vw-u between the W phase and the U phase. This conversion from line voltage to phase voltage is performed in voltage detector 6 or position detector 7.

Position detector 7 detects the position of the rotor of synchronous machine 20 based on signals from current transformer 5 and voltage detector 6 and applies a signal indicating the detected value to inverter controller 10 and converter controller 13.

Inverter controller 10 controls a firing phase of inverter 2 based on a signal from position detector 7. Specifically, inverter controller 10 includes a control angle calculator 11 and a gate pulse generator 12. Control angle calculator 11 calculates a phase control angle (firing angle) $\gamma$ based on the detected position of the rotor of synchronous machine 20 and applies the calculated phase control angle $\gamma$ to gate pulse generator 12. Gate pulse generator 12 generates a gate pulse (firing command) to be applied to the gates of the thyristors of inverter 2, based on phase control angle $\gamma$ received from control angle calculator 11. Inverter controller 10 corresponds to an embodiment of "first controller".

Converter controller 13 controls a firing phase of converter 1, based on a signal from position detector 7 and a signal from current detector 9. Specifically, converter controller 13 controls a firing phase of converter 1 such that DC current Id output from converter 1 matches current command value Id*. Converter controller 13 corresponds to an embodiment of "second controller".

Converter controller 13 includes a speed controller 14, a current controller 15, a control angle calculator 16, and a gate pulse generator 17. Speed controller 14 calculates the rotation speed of synchronous machine 20, based on the detected position of the rotor of synchronous machine 20. Speed controller 14 generates current command value Id*, which is a target value of DC current Id, based on the calculated rotation speed.

Current controller 15 calculates a deviation $\Delta$Id between current command value Id* and DC current Id and generates a voltage command value VDC1* based on the calculated deviation $\Delta$Id. Specifically, current controller 15 includes a proportional element (P), an integral element (I), and an adder. The proportional element multiplies deviation $\Delta$Id by a predetermined proportional gain for output to the adder, and the integral element integrates deviation $\Delta$Id by a predetermined integral gain for output to the adder. The adder adds the outputs from the proportional element and the integral element to generate voltage command value VDC1*. Voltage command value VDC1* corresponds to a control command that defines DC voltage VDC1 to be output by converter 1.

Converter 1 performs control such that DC voltage VDC1 is greater than DC voltage VDC2 on the input terminal side of inverter 2 by the amount of voltage drop by DC reactor 3. DC current Id is thus controlled.

Control angle calculator 16 calculates phase control angle α, based on voltage command value VDC1* applied from current controller 15. Here, when the effective value of line voltage of three-phase AC voltage supplied to converter 1 is Vs, average value VDC1 # of DC voltage VDC1 output from converter 1 is given by Equation (1) below, where the overlap angle is ignored.

$$VDC1\#=1.35Vs \cos \alpha \qquad (1)$$

Control angle calculator 16 substitutes voltage command value VDC1* to VDC1 # in Equation (1) to calculate phase control angle α and outputs the calculated phase control angle α. This is applied to gate pulse generator 17. Gate pulse generator 17 generates a gate pulse (firing command) to be applied to the gates of the thyristors of converter 1, based on phase control angle α received from control angle calculator 16.

The switching of converter 1 is controlled in accordance with the gate pulse generated by gate pulse generator 17, whereby DC current Id in accordance with current command value Id* is output from converter 1.

When armature windings ATU, ATV, and ATW of synchronous machine 20 are energized by thyristor starter 100 in this way, heat loss (Joule heat) occurs in armature windings ATU, ATV, and ATW. The heat loss is proportional to the square of the magnitude of current. Synchronous machine 20 is provided with a cooling structure in order to prevent synchronous machine 20 from overheating by heat loss.

The cooling structure of synchronous machine 20 will now be described.

Figure 2:
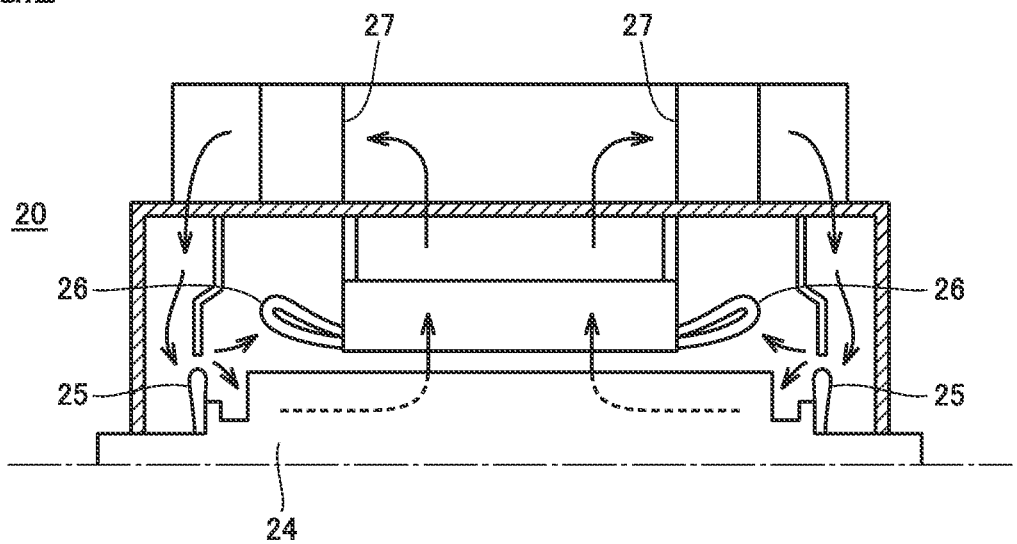
FIG. 2 is a cross-sectional view showing an example of a cooling structure of a synchronous machine.

FIG. 2 is a cross-sectional view showing an example of the cooling structure of synchronous machine 20. Referring to FIG. 2, a fan 25 is attached to the rotation shaft of a rotor 24 inside synchronous machine 20. Fan 25 is rotatably driven by the rotation of rotor 24. When fan 25 rotates, as shown by the arrows in the figure, a cooling medium circulates through a passage formed in rotor 24 and a stator 26. For example, hydrogen gas or air is used as the cooling medium. A cooler 27 is installed in the stator frame to face the passage. The cooling medium circulating through the passage is cooled by cooler 27, cooler 27 installed in the stator frame to face the passage.

In this way, fan 25 is rotated using the rotational force of rotor 24, and, therefore, when the rotation speed of synchronous machine 20 is low, the rotation speed of fan 25 is also low. This may reduce the cooling capacity of the cooling medium and consequently may cause overheating of synchronous machine 20.

Figure 3:
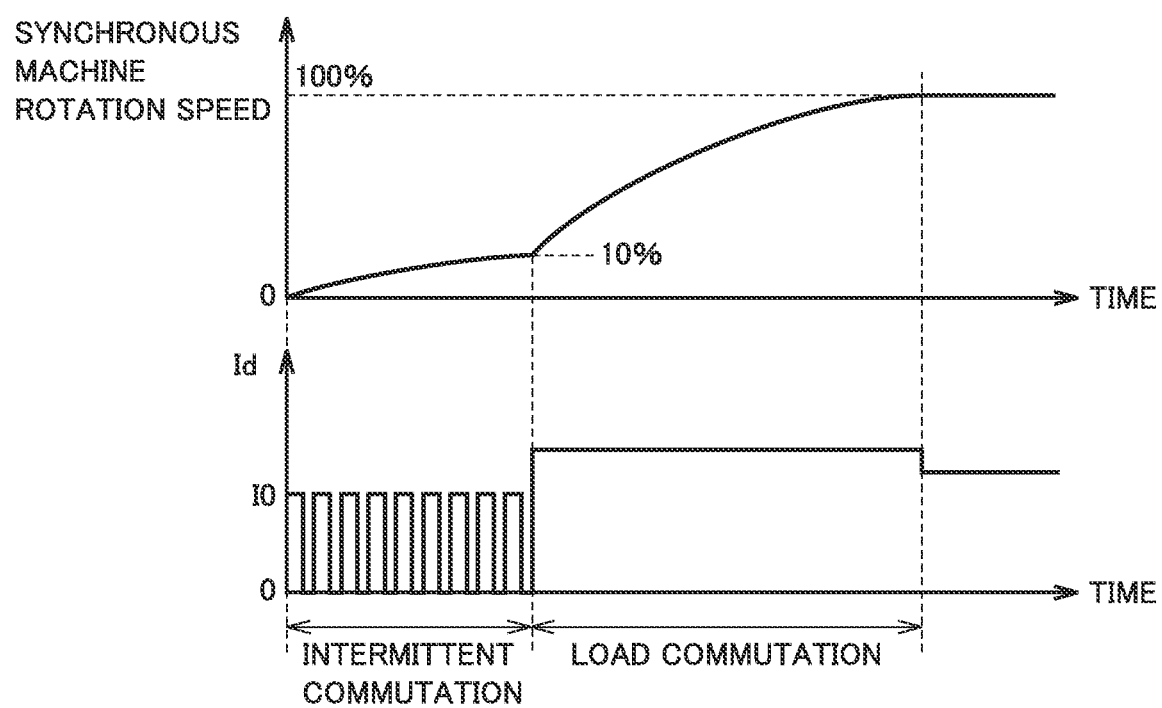
FIG. 3 is a time chart showing the operation of the thyristor starter.

Referring now to FIG. 3, the operation of thyristor starter 100 will be described.

FIG. 3 is a time chart showing the operation of thyristor starter 100. FIG. 3 shows DC current Id output from converter 1 and the rotation speed of synchronous machine 20.

In thyristor starter 100, commutation of the thyristors in inverter 2 is performed using counterelectromotive force (induced voltage) induced in armature windings ATU, ATV, and ATW of synchronous machine 20. Such commutation is called "load commutation".

However, when the rotation speed of synchronous machine 20 is low, that is, at startup or at a low speed of synchronous machine 20, the induced voltage produced in armature windings ATU, ATV, and ATW is low and therefore commutation of the thyristors may fail. For this reason, when the rotation speed of synchronous machine 20 is low, "intermittent commutation" is employed in which commutation of inverter 2 is performed by intermittently setting DC output current Id of converter 1 to zero.

As shown in FIG. 3, thyristor starter 100 is configured such that synchronous machine 20 is accelerated from the stop state to the rated rotation speed by sequentially switching and performing the intermittent commutation mode (first mode) and the load commutation mode (second mode).

Specifically, at time t=0, synchronous machine 20 in the stop state is started, and then thyristor starter 100 performs the intermittent commutation mode. Then, when the rotation speed of synchronous machine 20 reaches about 10% of the rated rotation speed, thyristor starter 100 switches from the intermittent commutation mode to the load commutation mode. In the following description, the rotation speed at which the intermittent commutation mode switches to the load commutation mode may be referred to as "switching rotation speed". In the example in FIG. 3, the switching rotation speed is about 10% of the rated rotation speed. However, the switching rotation speed may be set as desired in accordance with the relation between the rotation speed of synchronous machine 20 and the induced voltage.

In the intermittent commutation mode, DC current Id exhibits a pulse waveform. The peak value of each pulse is usually set to a constant value (Id=I0). The peak value is set, for example, such that the integrated value of AC power supplied to synchronous machine 20 during the intermittent commutation mode satisfies the amount of electric power for accelerating synchronous machine 20 in the stop state to the switching rotation speed.

Figure 4:
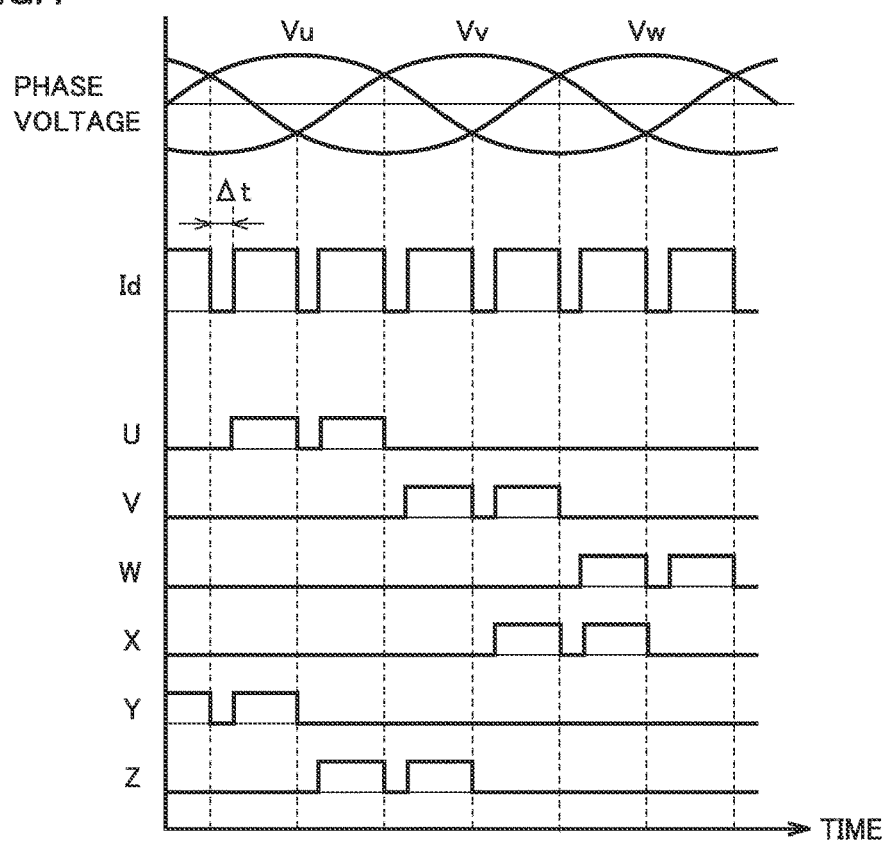
FIG. 4 is a time chart schematically showing a commutating operation of an inverter in an intermittent commutation mode.

FIG. 4 is a time chart schematically showing a commutating operation of inverter 2 in the intermittent commutation mode. FIG. 4 shows three-phase AC voltages Vu, Vv, and Vw, DC current Id output from converter 1, and the conducting thyristors of six thyristors U, V, W, X, Y, and Z in inverter 2.

In FIG. 4, the point at which line voltages Vu-v, Vv-w, and Vw-u are 0 V is the reference point of phase control angle γ, and at the reference point, γ=0°.

In a three-phase bridge inverter, the reference point appears every rotation position (electrical angle) 60° of the rotor of synchronous machine 20. Converter controller 13 (FIG. 1) controls DC voltage VDC1 output from converter 1 such that DC current Id=0 during time Δt, in synchronization with this reference point. During this time Δt, all the thyristors in inverter 2 are turned off and commutation operation is performed.

After the elapse of time Δt, inverter controller 10 applies a gate pulse to two necessary thyristors again to fire the two thyristor. At the same time, converter controller 13 applies a gate pulse to the gates of the thyristors of converter 1, based on current command value Id*. DC current Id then starts flowing again.

As shown in FIG. 3, since the rotation speed of synchronous machine 20 is low during the intermittent commutation mode, the rotation speed of fan 25 (see FIG. 2) attached to the rotation shaft of the rotor of synchronous machine 20 is also low. It therefore may be difficult to circulate the cooling medium through the passage formed in rotor 24 and stator 26 of synchronous machine 20. As a result, synchronous machine 20 may overheat during the intermittent commutation mode.

In order to suppress overheating of synchronous machine 20, it is effective to reduce current applied to synchronous machine 20 during the intermittent commutation mode. However, reducing current applied to synchronous machine 20 reduces the speed-up rate of synchronous machine 20 and thus prolongs the time taken for the rotation speed of synchronous machine 20 to reach the switching rotation speed, that is, the time spent for the intermittent commutation mode. As a result, it may take time to start synchronous machine 20.

Increasing the cooling capacity of the cooling medium to suppress overheating of synchronous machine 20 inevitably requires a larger capacity of the cooler and may lead increase in device size.

Then, in thyristor starter 100 according to the present embodiment, the magnitude of DC current Id is changed in accordance with the rotation speed of synchronous machine 20 in the intermittent commutation mode. Specifically, in the intermittent commutation mode, DC current Id is increased as the rotation speed of synchronous machine 20 is higher. Accordingly, DC current Id at a first rotation speed of synchronous machine 20 is smaller than DC current Id at a second rotation speed higher than the first rotation speed of synchronous machine 20.

Figure 5:
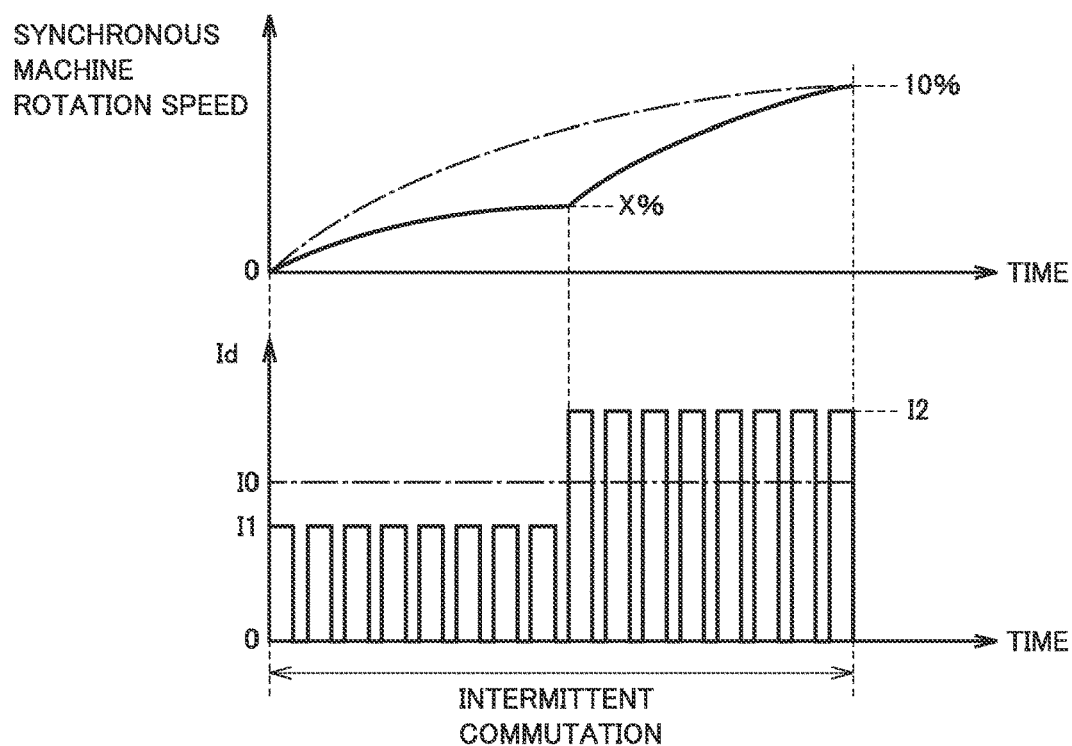
FIG. 5 is a time chart schematically showing the relation between the rotation speed of the synchronous machine and DC output current of a converter in the intermittent commutation mode.

FIG. 5 is a time chart schematically showing the relation between the rotation speed of synchronous machine 20 and DC current Id output from converter 1 in the intermittent commutation mode.

As shown in FIG. 5, in a period of time until synchronous machine 20 reaches X % (where X<10) of the rated rotation speed from the stop state, the maximum value (that is, the peak value of each pulse) of DC current Id output from converter 1 is I1. In a period of time until synchronous machine 20 reaches 10% (switching rotation speed) from X % of the rated rotation speed, the maximum value (the peak value of each pulse) of DC current Id output from converter 1 is I2 (I2>I1).

X % of the rated rotation speed can be set, for example, based on the lower limit rotation speed of fan 25 (see FIG. 2) at which the cooling medium can be circulated through the passage. According to this, in the rotation speed range (0 to X % of the rated rotation speed) that causes reduction in cooling capacity of the cooling medium, current supplied to synchronous machine 20 is reduced and heat loss (Joule heat) of synchronous machine 20 is therefore suppressed. As a result, overheating of synchronous machine 20 can be suppressed.

On the other hand, when the rotation speed of synchronous machine 20 is higher than the above rotation speed range, that is, when the cooling capacity of the cooling medium is ensured, current supplied to synchronous machine 20 increases. This can increase the speed-up rate of synchronous machine 20 and thus can prevent prolonged time spent for the intermittent commutation mode.

In FIG. 5, the rotation speed of synchronous machine 20 and DC current Id shown in FIG. 3 are indicated by dot and dashed lines. The relation I1<I0<I2 holds among I1, I2, and I0. Since setting I2 larger than I0 increases the speed-up rate, the time taken for synchronous machine 20 to be accelerated from X % to 10% of the rated rotation speed can be reduced compared with when Id=I0. Accordingly, the time spent for the intermittent commutation mode can be equalized between FIG. 3 and FIG. 5 by adjusting the magnitude of I2.

The adjustment of DC current Id shown in FIG. 5 can be performed by adjusting current command value Id* in accordance with the rotation speed of synchronous machine 20. That is, in the intermittent commutation mode, current command value Id* is set such that the current value is larger as the rotation speed of synchronous machine 20 is higher.

According to this, current command value Id* changes in accordance with the rotation speed of synchronous machine 20. As used in the present disclosure, "change in accordance with the rotation speed of synchronous machine 20" means that current command value Id* discretely changes in accordance with the rotation speed of synchronous machine 20 or that current command value Id* continuously changes in accordance with the rotation speed of synchronous machine 20.

By doing so, current command value Id* at the first rotation speed of synchronous machine 20 is smaller than DC current Id at the second rotation speed higher than the first rotation speed of synchronous machine 20.

Figure 6:
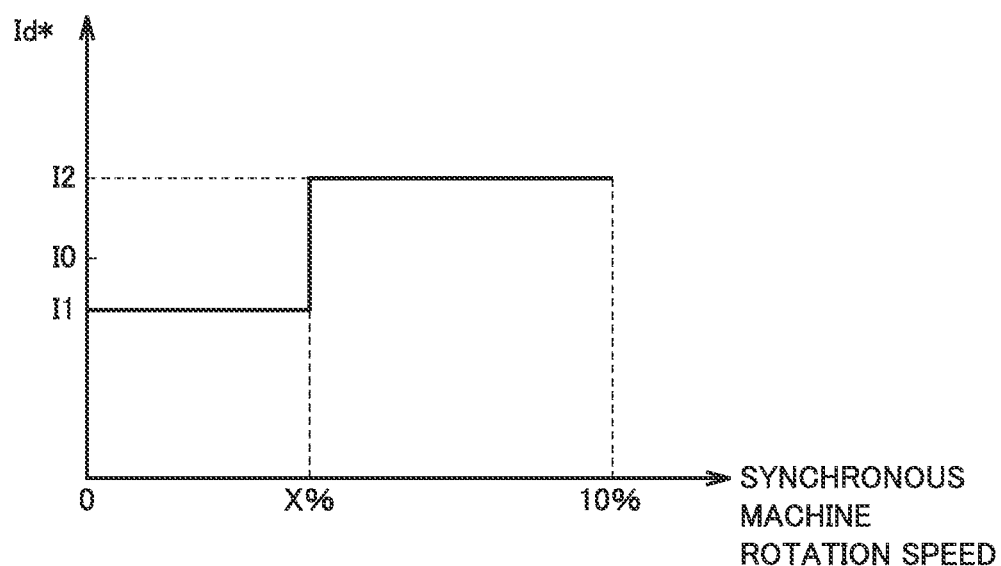
FIG. 6 is a diagram showing the relation between the rotation speed of the synchronous machine and a current command value in the intermittent commutation mode.

FIG. 6 is a diagram showing the relation between the rotation speed of synchronous machine 20 and current command value Id* in the intermittent commutation mode. As shown in FIG. 6, when the rotation speed of the synchronous machine is equal to or higher than 0 rpm and equal to or lower than X % of the rated rotation speed, current command value Id* is set to I1. On the other hand, when the rotation speed of synchronous machine 20 is higher than X % of the rated rotation speed and equal to or lower than 10%, current command value Id* is set to I2 (I2>I1).

Data showing the result shown in FIG. 6 can be stored in an internal memory of thyristor starter 100. Converter controller 13 can refer to the data to generate current command value Id* based on the calculated rotation speed of synchronous machine 20. The data may be in the form of a table or a function.

As described above, in the thyristor starter according to an embodiment of the present invention, during the intermittent commutation mode, DC output current of the converter is adjusted such that the current value is higher as the rotation speed of the synchronous machine is higher. Accordingly, the synchronous machine can be started in a short time while overheating of the synchronous machine is suppressed. In addition, size increase of the cooling structure for suppressing overheating of the synchronous machine can be suppressed.

In the foregoing embodiment, a configuration in which current command value Id* is changed in two steps in the intermittent commutation mode (see FIG. 6) has been illustrated. However, current command value Id* may be changed in three or more steps.

Figure 7:
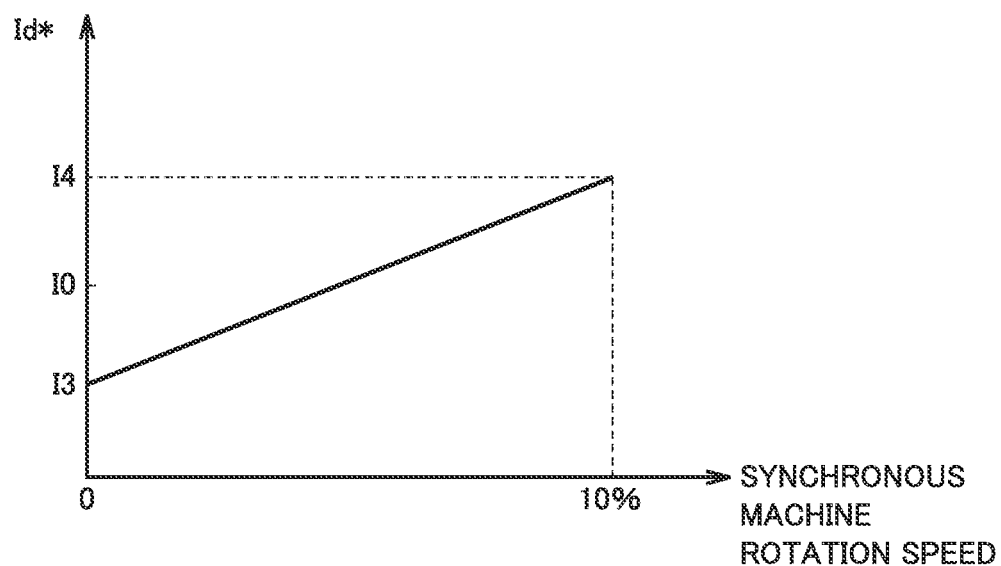
FIG. 7 is a diagram showing the relation between the rotation speed of the synchronous machine and a current command value in the intermittent commutation mode.

Alternatively, as shown in FIG. 7, during the intermittent commutation mode, current command value Id* may be continuously changed in accordance with the rotation speed of synchronous machine 20. In the example in FIG. 7, current command value Id* is I3 when the rotation speed of synchronous machine 20 is 0 rpm and is I4 (I4>I3) when the rotation speed of synchronous machine 20 is 10% of the rated rotation speed (switching rotation speed). In the example in FIG. 7, current command value Id* changes linearly in accordance with the rotation speed.

FIG. 8 is a time chart schematically showing the relation between the rotation speed of synchronous machine 20 and DC current Id output from converter 1 when the intermittent commutation mode is performed in accordance with the relation shown in FIG. 7.

As shown in FIG. 8, in a period of time until synchronous machine 20 reaches 10% of the rated rotation speed (switching rotation speed) from the stop state, DC current Id continuously changes. In FIG. 8, the rotation speed of synchronous machine 20 and DC current Id shown in FIG. 3 are shown by dot and dashed lines. The relation I3<I0<I4 holds among I3, I4, and I0. The time spent for the intermittent commutation mode can be equalized between FIG. 3 and FIG. 8 by adjusting the magnitude of I4.

In the foregoing embodiment, synchronous machine 20 is a generator rotatably driven by a gas turbine in a thermal power plant. However, the embodiment is not limited thereto, and synchronous machine 20 may be a synchronous machine for use in general industrial fields. For example, synchronous machine 20 may be a synchronous machine for a cooling blower in a steel plant.

The embodiments disclosed herein are illustrative and not limited to the description above. The scope of the present invention is defined by the claims, and it is intended that all modifications that come within meaning and range of equivalency of the claims are embraced.

REFERENCE SIGNS LIST

1 converter, 2 inverter, 3 DC reactor, 4, 5 current transformer, 6 voltage detector, 7 position detector, 9 current detector, 10 inverter controller, 11, 16 control angle calculator, 12, 17 gate pulse generator, 14 speed controller, 15 current controller, 20 synchronous machine, 22 field winding, 24 rotor, 25 fan, 26 stator, 27 cooler, 30 AC power supply, 100 thyristor starter, ATU, ATV, ATW armature winding, U, V, W, X, Y, Z thyristor, TR transformer.

The invention claimed is:

1. A thyristor starter for starting a synchronous machine, comprising:
   a converter that converts AC power into DC power;
   a DC reactor that smoothes the DC power;
   an inverter that converts the DC power applied from the converter through the DC reactor into AC power with a variable frequency and supplies the AC power to the synchronous machine;
   a position detector that detects a rotor position of the synchronous machine;
   a first controller that controls a firing phase of a thyristor in the inverter, based on a detection signal of the position detector; and
   a second controller that controls a firing phase of a thyristor in the converter such that DC output current of the converter matches a current command value, based on a detection signal of the position detector, wherein
   the thyristor starter accelerates the synchronous machine from a stop state to a predetermined rotation speed by sequentially performing a first mode and a second mode, the first mode of performing commutation of the inverter by intermittently setting the DC output current to zero, the second mode performing commutation of the inverter by induced voltage of the synchronous machine,
   the synchronous machine including:
      a stator receiving suppl of the AC power supplied from the inverter:
      a rotor; and
      a fan that is attached to a rotation shaft of the rotor, the fan circulating a cooling medium through a passage formed in the rotor and the stator,
   in the first mode, the current command value is set such that a current value is larger as rotation speed of the synchronous machine is higher, and
   the current command value at a first rotation speed lower than a prescribed rotation speed is smaller than the current command value at a second rotation speed higher than the prescribed rotation speed, the prescribed rotation speed being set based on a lower limit rotation speed of the fan at which the cooling medium can be circulated through the passage.

2. The thyristor starter according to claim 1, wherein in the first mode, the second controller discretely changes the current command value in accordance with rotation speed of the synchronous machine.

3. The thyristor starter according to claim 1, wherein in the first mode, the second controller continuously changes the current command value in accordance with rotation speed of the synchronous machine.

4. The thyristor starter according to claim 1, wherein in the first mode,
   the first controller fires a thyristor in the inverter when the DC output current is zero elapses, and
   the second controller controls a firing phase of a thyristor in the converter in accordance with the current command value when the DC output current is zero elapses.

* * * * *